C. T. HOLLOWAY.
Fire-Engine Truck.
No. 224,911. Patented Feb. 24, 1880.
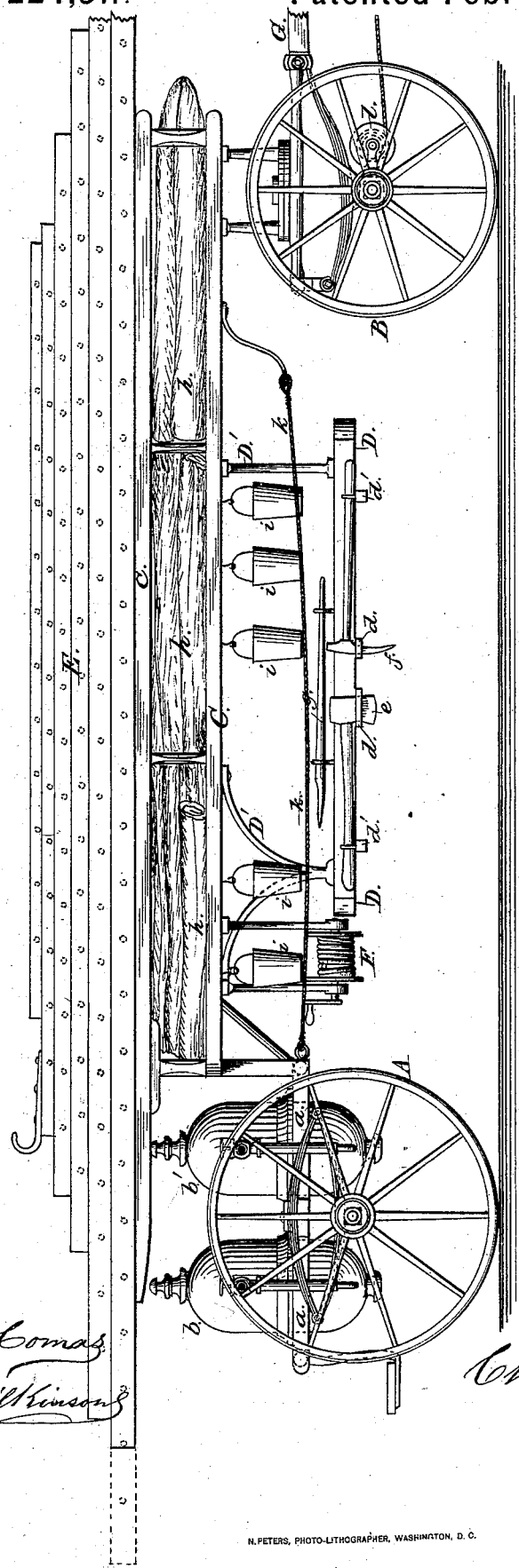

UNITED STATES PATENT OFFICE.

CHARLES T. HOLLOWAY, OF BALTIMORE, MARYLAND.

FIRE-ENGINE TRUCK.

SPECIFICATION forming part of Letters Patent No. 224,911, dated February 24, 1880.

Application filed July 19, 1879.

*To all whom it may concern:*

Be it known that I, CHARLES T. HOLLOWAY, of Baltimore city and State of Maryland, have invented certain new and useful Improvements in Chemical Fire-Engine and Truck; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to improve the construction of chemical fire-engines, more especially adapted for small towns, villages, private establishments, &c., and to combine therewith ladders, tools, buckets, salvage-corps equipments, &c.; and the invention consists of a truck having arranged between the rear wheels a platform for the reception of two or more vessels or tanks for containing the acids for extinguishing the fire, a main frame or rack connecting the rear wheels with the front wheels, upon which the ladders and the salvage-corps equipments are carried, as also a rack suspended therefrom, in which the axes, picks, and crow-bars are carried, a reel for the hose, and certain other parts appertaining to a chemical engine and truck for use at fires, all of which will be more fully described in the following specification, reference being had to the accompanying drawings, in which—

Figure 1 represents a side elevation of my improved chemical engine and truck. Fig. 2 is a plan view of the rack for supporting the axes, picks, &c. Fig. 3 is a cross-section of a modified form for carrying the ladders.

In the drawings, A represents the rear wheels, and B the front wheels, of the truck, provided with the usual springs, fifth-wheel, &c.

Between the wheels A is arranged a platform, $a$, in which the vessels $b\ b'$ of the chemical engine are supported. To the platform $a$ is secured the frame or rack C, extending forward and supported at the end by the wheels B, with the usual fifth-wheel, springs, &c.

To the lower side of the frame C is attached a rack, D, by brackets $D'\ D'$, provided with cross-pieces $d$, having suitable perforations to receive the axes $e$ and picks $f$ at one end, while the other ends are supported on cross-pieces provided with pins to retain the handles. One or more crow-bars, $g$, may also be carried on this rack.

The frame C serves to carry rubber or other suitable covers $h$ for the salvage corps, as well as buckets $i$ and the ladders E on top.

In the rear of rack D is arranged a reel, F, in suitable brackets, for the reception of the fire-hose for the chemical engine.

On each side of frame C is arranged a rope, $k$, to assist in pulling the truck to the fire when manual power is used instead of horse-power. The front truck is provided with a tongue, G, to which horses can be attached; or it can be made for manual power by having a rope wound on a reel, $l$, attached to the front axle, with which the men can pull the apparatus, as is done with hand-engines.

As a modification of the rack C, a rack, H, (shown in cross-section in Fig. 3,) may be used, in which the ladders are supported on their edges instead of on their sides, the other parts remaining the same; or the salvage-corps covers may be omitted, if desired.

The great advantages of my improved chemical fire-engine and truck are, that everything required and necessary at a fire is arranged in a compact and easily-accessible manner. It can be drawn by horses, as is usual in large cities, where long distances are to be traveled, or it can be drawn by men, as hand-engines, when in towns or villages. It can be furnished at a very reasonable cost, and will cost less to use at fires than when engine, hook and ladders, and salvage-corps implements are separated.

Having thus described my invention, what I claim, and desire to secure by Letters Patent, is—

1. A truck for use at fires, consisting of a platform for supporting a chemical fire-engine, a frame, C, for carrying the ladders E, covers $h$, and buckets $i$, and the rack D, provided with cross-pieces $d\ d\ d'\ d'$, for axes, picks, &c., all constructed and arranged as shown and described.

2. The combined truck and fire-engine herein described, consisting of the running-gear and wheels supporting the platform for carrying the engine, the frame C, for receiving the ladders E, covers $h$, and buckets $i$, and the rack D, provided with cross-pieces $d$ $d$ $d'$ $d'$, for axes, picks, &c., all constructed and arranged substantially as shown, and for the purpose specified.

3. The combined fire-engine and truck herein described, consisting of the running-gear, the platform for carrying the engine, the frame C, ladders E, rack D, having cross-pieces $d$ $d$ $d'$ $d'$, hose-reel F, tongue G, reel $l$, and salvage apparatus, all constructed and arranged substantially as shown, and for the purpose set forth.

In testimony that I claim the foregoing as my own I hereto affix my signature in presence of two witnesses.

CHAS. T. HOLLOWAY.

Witnesses:
T. W. McCOMAS,
W. S. WILKINSON.